United States Patent [19]

Hoeksma

[11] Patent Number: 4,566,060
[45] Date of Patent: Jan. 21, 1986

[54] DC-TO-AC VOLTAGE CONVERTER HAVING GALVANICALLY SEPARATED INPUT AND OUTPUT(S)

[75] Inventor: Gerben S. Hoeksma, Winterswijk, Netherlands

[73] Assignee: N.V. Nederlandsche Apparatenfabriek Nedap, De Groenlo, Netherlands

[21] Appl. No.: 528,153

[22] Filed: Aug. 31, 1983

[30] Foreign Application Priority Data

Sep. 6, 1982 [NL] Netherlands ............ 8203474

[51] Int. Cl.$^4$ ............................ H02M 3/335
[52] U.S. Cl. ........................ 363/21; 363/97; 323/289
[58] Field of Search ........... 363/19, 21, 56, 80, 363/97, 131; 315/151, 158, 224, 225, 307, DIG. 7; 323/289; 307/280, 300

[56] References Cited

U.S. PATENT DOCUMENTS

| | | | |
|---|---|---|---|
| 3,973,220 | 8/1976 | Fender et al. | 363/19 |
| 4,058,758 | 11/1977 | Peterson | 363/56 |
| 4,156,273 | 5/1979 | Sato | 363/21 |
| 4,383,292 | 5/1983 | Onodera et al. | 363/21 |
| 4,387,418 | 6/1983 | Koike | 363/97 |
| 4,410,934 | 10/1983 | Fathauer et al. | 363/56 |
| 4,464,606 | 8/1984 | Kane | 363/56 |
| 4,464,709 | 9/1984 | Barter | 363/19 |

Primary Examiner—Peter S. Wong
Assistant Examiner—Judson H. Jones
Attorney, Agent, or Firm—Fleit, Jacobson, Cohn & Price

[57] ABSTRACT

A DC-to-AC voltage converter for the supply of power to at least one load, comprising an input circuit and at least one output circuit galvanically separated from said input circuit, and a converter transformer. According to the invention a primary winding of the converter transformer is series-connected to a switching transistor, which series circuit arrangement is connected between a positive input terminal and a negative input terminal, with one or more resonance capacitors being connected in parallel with the collector-emitter circuit of the switching transistor and/or in parallel with said primary winding. Control circuitry is provided for said switching transistor, with the resonance capacitor(s) and said primary winding being dimensioned so that, under all anticipated load conditions of the converter, including short-circuiting of the output circuits, the control causes the voltage across the collector-emitter circuit of the switching transistor, after the latter has become non-conductive, to fall back to a very low value before the switching transistor is again driven into the conductive state. The converter transformer has a first auxiliary winding strongly coupled with said primary winding and, at least in part, provides the driving power required for the switching transistor. A time-delay and turn-off circuit is energized and synchronized by at least one second auxiliary winding of the converter transformer, and a smoothing circuit provides the driving power for turning off the switching transistor, which driving power is withdrawn from a third auxiliary winding of the converter transformer.

23 Claims, 5 Drawing Figures

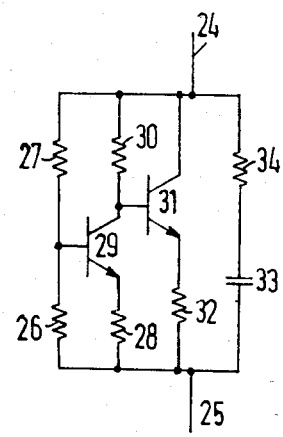
FIG.2
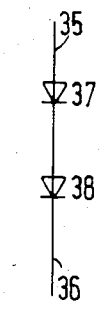
FIG.3
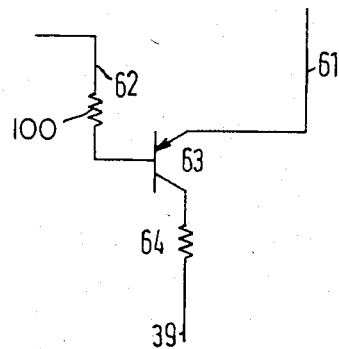
FIG.5
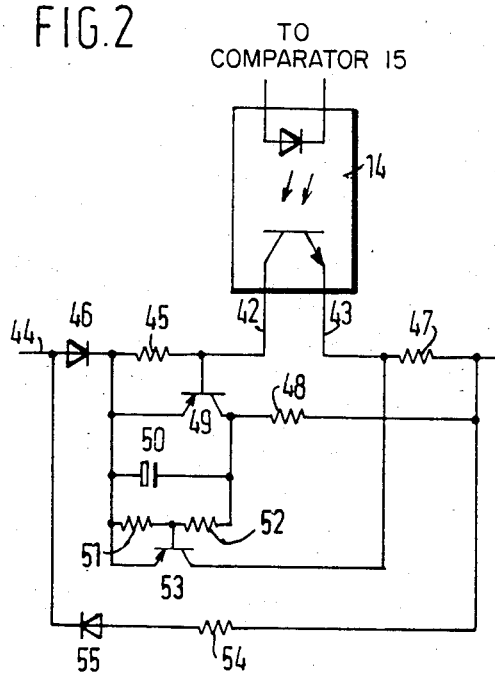
FIG.4
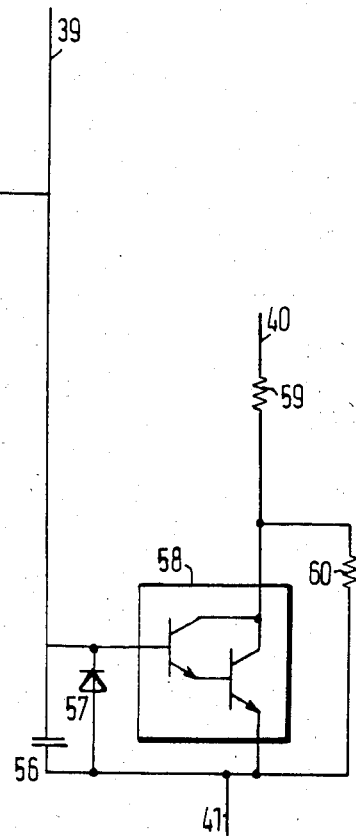

DC-TO-AC VOLTAGE CONVERTER HAVING GALVANICALLY SEPARATED INPUT AND OUTPUT(S)

BACKGROUND

This invention relates to a DC-to-AC voltage converter for the supply of power to at least one load, and having galvanically separated input and output circuits.

DC-to-AC voltage converters have many uses, such as the supply of power to gas discharge lamps or, after rectifying and smoothing the AC voltage, supplying power to electronic circuits, motors, relays, magnetic valves, magnetic clutches, etc.

OBJECTS AND SUMMARY

The converter comprises at least one switching transistor, a resonance capacitor, a converter transformer, and control means for the switching transistor.

It is an object of the present invention to provide the switching transistor included in the input circuit of the converter effectively with driving power so that in case power is supplied from a relatively high DC input voltage (e.g. of between 50 V and 1000 V) little power is lost, and without a separate transformer being required for driving the switching transistor.

It is another object of the present invention to adapt the driving power for the switching transistor in a simple manner to the load condition of the converter in order to make for proper and reliable operation of the converter, in particular under light-load conditions.

This object is achieved in the circuit according to the present invention by using charge storage in the switching transistor proper.

It is still another object of the present invention to achieve an optimum load of the switching transistor in order to enhance the converter's reliability. For this purpose the winding included in the input circuit of the converter is not strongly coupled with the windings in the output circuit(s), and at least one resonance capacitor is included in the input circuit. The converter transformer, the resonance capacitor and the control means for the switching transistor are so dimensioned and designed that the voltage generated across the collector and emitter of the switching transistor, after the transistor has been turned off, falls back to a very low value before the switching transistor is again rendered conductive, also in the case of short-circuiting of the output circuit(s). When the switching transistor becomes non-conductive, the same resonance capacitor provides for a slowly increasing collector-emitter voltage. In this way, both when it becomes conductive and when it becomes non-conductive, the switching transistor is loaded very favourably, with a very small chance of secondary breakdown, and the converter is capable of operating very reliably without the use of power dissipating means.

BRIEF DESCRIPTION OF THE DRAWINGS

The invention will be described in more detail hereinafter with reference to the accompanying drawings, showing a preferred embodiment by way of example. In said drawings FIG. 1 diagrammatically shows an example of a circuit according to the present invention; and FIGS. 2-5 show details of FIG. 1.

DETAILED DESCRIPTION OF THE DRAWINGS

Figure 1:
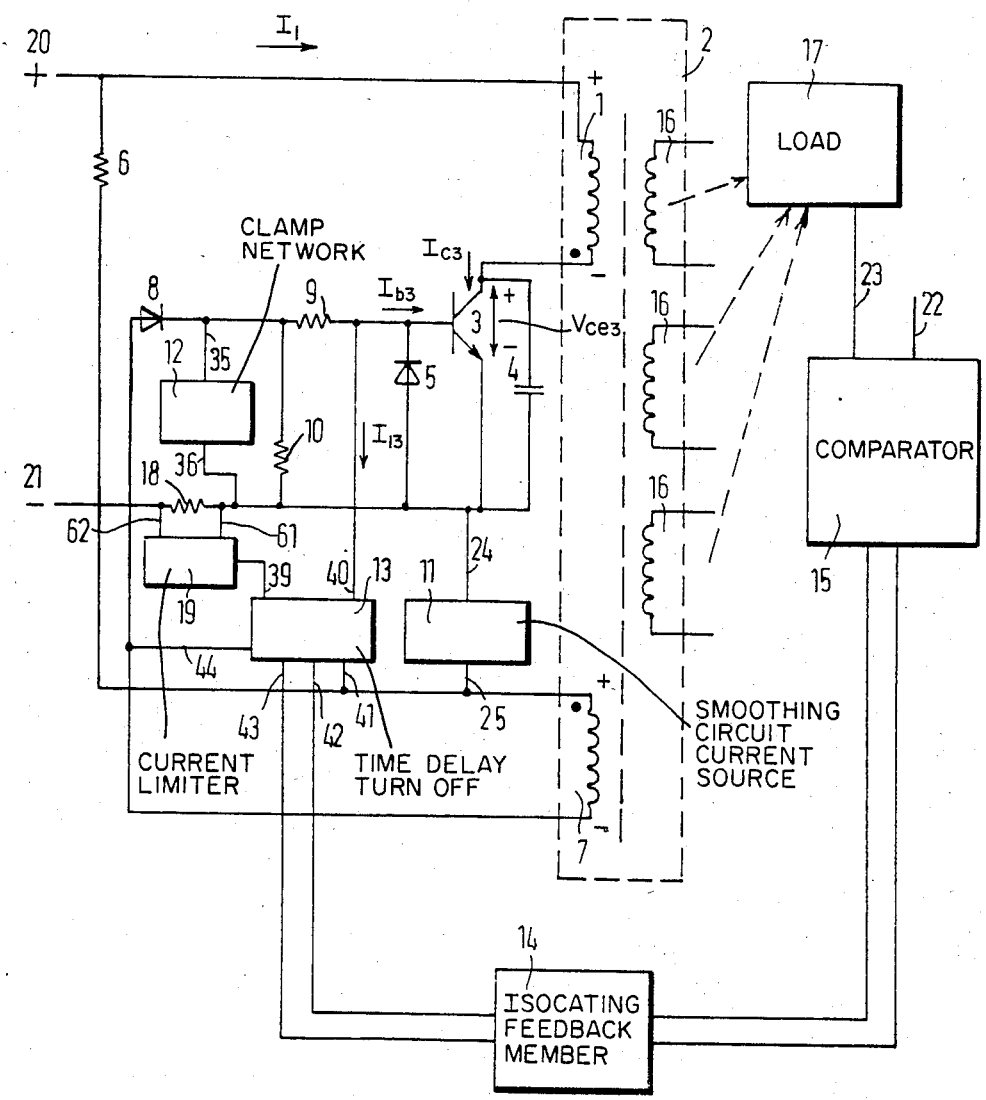

A circuit arrangement in accordance with the present invention is shown in FIG. 1. The primary circuit comprises a series circuit of a primary winding 1 of a converter transformer 2 and a switching transistor 3, which series circuit is connected between a positive input terminal 20 and a negative input terminal 21. Current $I_1$ is applied to winding 1. Connected in parallel to transistor 3 and/or in parallel to winding 1 is at least one resonance capacitor 4. When the supply voltage is applied to terminals 20 and 21, transistor 3 receives base driving power via a starting resistor 6, a primary auxiliary winding 7, a diode 8 and a base resistor 9. A resistor 10 connected between the end of resistor 9 remote from the base and the emitter of transistor 3 is dimensioned so that the circuit is unable to start when the voltage applied to terminals 20 and 21 is insufficient, as the base-emitter junction of transistor 3 is then insufficiently biased. The starting resistor 6 is relatively high-ohmic, and accordingly dissipates little power.

As the transistor becomes conductive, a voltage is generated across the auxiliary winding 7, which is strongly coupled with the primary winding 1 of transformer 2. Therefore, transistor 3 receives sufficient driving power via a auxiliary winding 7, diode 8, and base resistor 9 to be driven into saturation. A smoothing circuit/current source network 11 is designed as a source of current and smoothing device and operates as a current sink. A voltage limiter 12 (clamp network) serves to limit the base current $I_{b3}$; of transistor 3, and hence the collector current $I_{c3}$ of transistor 3, in particular during starting. The auxiliary winding 7 of transformer 2 also supplies power to a time-delay and turn-off network 13, which turns off transistor 3 at a variable instant after the transistor has become conductive. This turning off is effected by taking over the current originally flowing through base resistor 9, and finally by withdrawing a negative base current from transistor 3 via a terminal 40 ($I_{13}$). The time lapsing between the instant the switching transistor 3 becomes conductive and the decrease and reversal of the base driving current of transistor 3 can be influenced by an analog positive feedback signal which is transmitted via a feedback member 14 featuring galvanic separation or by another adjusting member, not shown, connected to t-delay turn-off network 13. As shown in FIG. 4, the feedback member 14 may comprise, for example, an "optocoupler" consisting of a light emitting diode and a phototransistor. The feedback signal referred to comes from a comparator circuit 15 which compares the desired value 22 of a physical magnitude converted into an electrical voltage, such as a voltage, current, light intensity, sound pressure, or combinations thereof, with an actual value 23 converted into an electrical voltage, and on this ground can supply a control signal to the feedback member 14, thereby to stabilize the output magnitude. If the comparator circuit 15 is designed with galvanic separation, its output signal may also be supplied to t-delay turn-off network 13 either directly or indirectly.

Power is supplied to output load(s) 17 from secondary winding(s) 16 of transformer 2, which are not strongly coupled with the primary windings 1 and 7. After transistor 3 has become conductive, the current through winding 1 increases in time. After transistor 3 has become non-conductive, a voltage pulse of sine-like form is formed across the collector-emitter circuit ($V_{ce3}$) of transistor 3 owing to the resonant behaviour of capacitor 4 and the self-induction as appearing between the terminals of primary winding 1. The peak voltage of this pulse is higher when transistor 3 is conductive for a longer period of time. The voltage $V_{ce3}$ between the collector and emitter of transistor 3 falls back to 0 V and subsequently a backfire current flows in forward direction through the base-collector diode of transistor 3 and through a diode 5 connected between the base and emitter terminals of transistor 3. This backfire current results in charge storage in the base-collector diode of transistor 3. It is noted that a so-called effiency diode, which is often provided in parallel to the collector-emitter circuit of a transistor, is absent in this arrangement. The charge thus stored is capable of supplying a large part of the driving power for transistor 3 in the subsequent conductive period of transistor 3. As compared with existing circuits, only a small amount of extra base driving power is required to keep transistor 3 in the saturated condition until the instant it is turned off. As the magnitude of the backfire current and the time during which it flows increases, the end value of the collector current $I_{ce}$ of transistor 3 increases, and this current, and the time during which it flows, are determinative of the amount of charge stored in the base-collector diode of transistor 3 (and within certain limits proportional thereto). This driving power, owing to charge storage, automatically adapts itself to the collector end current of transistor 3, and hence to the load condition of the converter. In the case of small collector end currents of transistor 3, the backfire currents referred to do not occur, or to a slight extent only, and the small base current of transistor 3 supplied via resistor 9 does not lead to supersaturation of transistor 3. As a result the converter can be sufficiently turned down even when in unloaded or lightly-loaded condition, without it being necessary for the base current to be removed too rapidly and reversed, which would involve the risk of secondary breakdown by "current-tailing" of the switching transistor; and without the occurrence of control instabilities which lead to the converter being periodically switched on and off, which also involves the risk of secondary breakdown owing to the repeated loads when the converter is repeatedly re-started. Accordingly, the drive by charge storage, which automatically adapts itself to the load condition, increases the converter's reliability, in particular in lightly-loaded condition.

An extension of the arrangement, also shown in FIG. 1, comprises a current measuring resistor 18 and a collector current limiter circuit 19. The collector current limiter circuit 19 comprises a comparator circuit which, when a given voltage level appears across resistor 18 corresponding to a given collector current $I_{c3}$ of switching transistor 3 is exceeded, supplies a signal to turn-off network 13, which renders transistor 3 non-conductive, in the manner described before.

To the time-delay and turn-off network 13 another function may be added: if, within a certain time after the converter has been turned on no feedback signal is received, network 13 automatically turns off the converter, or adjusts it to a low level. In this way, overload of the secondary rectifier(s), if present, and the output load(s) is prevented, and there is also provided a safeguard against the results of the feedback member 14 becoming out of order.

In a preferred embodiment of the circuit according to the invention, the blocks shown in FIG. 1 are designed as shown in FIGS. 2-5.

Smoothing circuit/current source, block 11 in FIG. 1, may be designed as shown in FIG. 2. Terminals 24 and 25 correspond to those in FIG. 1. The smoothing function is carried out by a capacitor 33, while resistor 34 limits the currents flowing to and from the smoothing capacitor 33. When the voltage across the network comprising resistors 26, 27, 28, 30 and 32 and transistors 29 and 31 increases, a decreasing current flows through this network, which accordingly behaves as a negative resistor. This is of importance when the converter must be able to function in a wide range of input voltages, because the base driving power required for transistor 3 decreases with increasing input voltage; an increasing input voltage also results in an increasing voltage across the network.

Resistor 32 is considerably lower in ohmic value than resistors 26, 27, 28 and 30.

In a preferred embodiment of the circuit, the clamp network, block 12 in FIG. 1, is designed as shown in FIG. 3. Terminals 35 and 36 in FIG. 3 correspond to the like numbered terminals of FIG. 1.

In a preferred embodiment of the circuit according to the invention, time delay/turn off block 13 is designed as shown in FIG. 4. This embodiment also includes the safeguard against overload of the converter and against the feedback loop becoming defective. Its operation is as follows. After transistor 3 has become conductive, terminal 44 becomes positive relative to terminal 41 owing to the voltage generated across auxiliary winding 7. Via a diode 46, a capacitor 50 (which immediately after the converter has been turned on is still uncharged) and a resistor 48, a capacitor 56 is charged until a Darlington transistor circuit 58 becomes conductive, and via a resistor 59 causes transistor 3 to become non-conductive. Subsequently the base of transistor 3 is kept negative relative to its emitter via resistor 59 and a resistor 60. Capacitor 56 is discharged, owing to the voltage across auxiliary winding 7 being reversed in polarity, via a diode 55 and a resistor 54, until a voltage value of about 0.7 V is reached (determined by diode 57), and is re-charged during the next period when transistor 3 is conductive.

When, some time after the converter has been turned on, the desired value of the output magnitude is reached the phototransistor of an optocoupler, which in this example is present in the feedback member 14, becomes conductive, and capacitor 56 is charged via diode 46, resistor 45, the phototransistor of the optocoupler and resistor 47, and this the more rapidly as the phototransistor of the optocoupler is more conductive. A transistor 49 is now rendered conductive by the voltage drop across resistor 45, which in turn is a result of the feedback signal supplied via the optocoupler. Transistor 49 then short-circuits capacitor 50 and transistor 53 remains cut-off. When the feedback signal does not appear, after a time determined by the RC time of resistor 48 and capacitor 50, transistor 53 will be rendered conductive and, via resistor 47, capacitor 56 will be very rapidly charged, thereby turning off transistor 3 after a very short conductive period, and so controlling the converter to a minimum level.

A preferred embodiment of current limiter the arrangement of block 19 is shown in FIG. 5. The terminals correspond to FIG. 1. As soon as the voltage across resistor 18 has increased to about 0.7 V (transistor 63 is a silicon pnp transistor) transistor 63 becomes conductive and via resistor 64 capacitor 56 is charged very rapidly, whereafter transistor 58 renders transistor 3 non-conductive.

It will be clear that, in the light of the foregoing, various variants will readily occur to those skilled in the art without departing from the scope of the present invention.

I claim:

1. A DC-to-AC voltage converter for the supply of power to at least one load, comprising an input circuit and at least one output circuit galvanically separated from said input circuit, and a converter transformer, characterized in that a primary winding of the converter transformer is series-connected to a switching transistor, which series circuit arrangement is connected between a positive input terminal and a negative input terminal, with one or more resonance capacitors being connected in parallel with the collector-emitter circuit of the switching transistor and/or in parallel with said primary winding; there being provided control means for said switching transistor, with the resonance capacitor(s) and said primary winding being dimensioned so that, under all anticipated load conditions of the converter, including short-circuiting of the output circuits, the control means causes the voltage across the collector-emitter circuit of the switching transistor, after the latter has become non-conductive, to fall back to a very low value before the switching transistor is again driven into the conductive state and dimensioned such that the backfire current through the base-collector diode of said switching transistor results in a charge storage in said switching transistor which is adapted to supply a substantial part of the driving power for said switching transistor, said backfire current being determined at least in part by said load and hence said charge storage is adapted to automatically follow said load; said converter transformer having a first auxiliary winding strongly coupled with said primary winding and, at least in part, providing the driving power required for the switching transistor; there being provided a time-delay and turn-off circuit energized and synchronized by at least one second auxiliary winding of the converter transformer; there being provided a smoothing circuit providing the driving power for turning off the switching transistor, which driving power is withdrawn from a third auxiliary winding of the converter transformer.

2. A converter according to claim 1, characterized in that the first and second auxiliary windings are one and the same auxiliary winding (7).

3. A converter according to claim 1, characterized in that the first and third auxiliary windings are one and the same auxiliary winding (7).

4. A converter according to claim 1, characterized in that the first, second and third auxiliary windings are one and the same auxiliary winding (7).

5. A converter according to claim 1, characterized in that a diode (5) is connected anti-parallel to the base-emitter diode of the transistor (3), and that the driving power of the switching transistor (3) is supplied at least in part by charge storage in the base-collector diode of the switching transistor, which driving power adapts itself automatically to the collector end current of the switching transistor to prevent supersaturation of the transistor in the event of small collector output currents.

6. A converter according to claim 1, characterized by an adjustment means connected to said time-delay and turn-off circuit (13), and capable of affecting the conduction interval of the switching transistor to control the power supplied to the load(s) (17).

7. A converter according to claim 6, characterized in that said adjusting means comprises a feedback member (14) connected between the input circuit and the output (circuit(s) (17), designed so that the galvanic separation between input and output circuit(s) is maintained in said feedback member.

8. A converter according to claim 7, characterized in that said feedback member comprises an optocoupler.

9. A converter according to claim 7, characterized by a comparator circuit (15) connected between the output circuit(s) and the feedback member (14), said comparator circuit being arranged to compare the actual value of an output magnitude with a set target value, and to supply an output signal dependent on such comparison to said feedback member.

10. A converter according to claim 6, characterized in that said adjusting means comprises a comparator circuit (15) coupled with the output circuit(s) while maintaining a galvanic separation, said comparator circuit being arranged to compare the actual value of an output magnitude with a set target value and to supply an output signal dependent on such comparison to said time-delay and turn-off circuit (13).

11. A converter according to claim 9, characterized in that the output magnitude is formed by rectifying and smoothing the voltages across the secondary winding(s) (16) of the converter transformer.

12. A converter according to claim 10, characterized in that the output magnitude is formed by rectifying and smoothing the voltages across the secondary winding(s) (16) and the converter transformer.

13. A converter according to claim 9, characterized in that the output magnitude is the light intensity of one or more gas discharge lamps connected to the secondary winding(s) (16) of the converter transformer.

14. A converter according to claim 10, characterized in that the output magnitude is the light intensity of one or more gas discharge lamps connected to the secondary winding(s) (16) of the converter transformer.

15. A converter according to claim 1, characterized by a current limiter (19) comprising a comparator circuit and limiting the collector end current of the switching transistor, and turning off said switching transistor via the time-delay and turn-off circuit (13) upon a pre-determined value of the collector end current being reached.

16. A converter according to claim 7, characterized by a time measuring circuit (48, 50, 53) coupled to said feedback member (14) and arranged to turn off the converter or adjust it to a low value if no feedback signal is received for a pre-determined period after the converter has been turned on.

17. A converter according to claim 16, characterized in that the time measuring circuit forms part of the time-delay and turn-off circuit (13) and is capable of turning off the switching transistor.

18. A DC-to-AC voltage converter for the supply of power to at least one load, comprising an input circuit and at least one output circuit galvanically separated from said input circuit, and a converter transformer, characterized by (a) a primary winding of the converter transformer series-connected to a switching transistor, which series circuit arrangement is connected between a positive input terminal and a negative input terminal, with one or more resonance capacitors being connected in parallel with the collector-emitter circuit of the switching transistor and/or in parallel with said primary winding;

(b) control means for said switching transistor;

(c) the resonance capacitor(s) and said primary winding being dimensioned so that, under all anticipated load conditions of the converter, including short-circuiting of the output circuits, the control means causes the voltage across the collector-emitter circuit of the switching transistor, after the latter has become non-conductive, to fall back to a very low value before the switching transistor is again driven into the conductive state;

(d) said converter transformer having an auxiliary winding strongly coupled with said primary winding and, at least in part, providing the driving power required for the switching transistor;

(e) a time-delay and turn-off circuit energized and synchronized by said auxiliary winding of the converter transformer;

(f) a smoothing circuit providing the driving power for turning off the switching transistor, which driving power is withdrawn from said auxiliary winding of the converter transformer;

(g) a diode connected anti-parallel to the base-emitter diode of the transistor, the driving power of the transistor being provided at least partly by charge storage in the base-collector diode of the transistor due to a backfire current therethrough;

(h) a feedback member connected between the output circuit(s) and the time-delay and turn-off circuit and designed so that the galvanic separation between input and output circuit(s) is maintained in said feedback member;

(i) a comparator circuit connected between the output circuit(s) and the feedback member and being arranged to compare the actual value of an output magnitude with a set target value and to supply an output signal dependent on such comparison to said feedback member.

19. A converter according to claim 18, characterized by a current limiter (19) comprising a comparator circuit, and limiting the collector end current of the switching transistor, and turning off said switching transistor via the time-delay and turn-off circuit (13) upon a pre-determined value of the collector end current being reached.

20. A converter according to claim 19, characterized by a time measuring circuit (48, 50, 53) coupled to said feedback member (14) and arranged to turn off the converter or adjust it to a low value if no feedback signal is received for a pre-determined period after the converter has been turned on.

21. A converter according to claim 20, characterized in that the time measuring circuit forms part of the time-delay and turn-off circuit (13) and is capable of turning off the switching transistor.

22. A converter according to claim 18 characterized in that the output magnitude is formed by rectifying and smoothing the voltages across the secondary winding(s) (16) of the converter transformer.

23. A converter according to claim 18, characterized in that the output magnitude is the light intensity of one or more gas discharge lampes connected to the secondary winding(s) (16) of the converter transformer.

* * * * *